United States Patent [19]
Kanno

[11] Patent Number: 5,943,650
[45] Date of Patent: Aug. 24, 1999

[54] OPERATION MANAGEMENT SYSTEM AND OPERATION MANAGEMENT METHOD

[75] Inventor: Kazuhiro Kanno, Koriyama, Japan

[73] Assignee: Hiromasa Murakoshi, Koriyama, Japan

[21] Appl. No.: 08/884,472

[22] Filed: Jun. 27, 1997

[30] Foreign Application Priority Data

Jul. 8, 1996 [JP] Japan ..................................... 8-178130
May 21, 1997 [JP] Japan ..................................... 9-130626

[51] Int. Cl.⁶ ................................................. G06F 19/00
[52] U.S. Cl. ................................................. 705/1; 380/4
[58] Field of Search ................ 705/1; 380/4; 364/474.07

[56] References Cited

U.S. PATENT DOCUMENTS

| | | | |
|---|---|---|---|
| 5,564,038 | 10/1996 | Grantz et al. | 711/164 |
| 5,579,222 | 11/1996 | Bains et al. | 395/712 |
| 5,634,012 | 5/1997 | Stefik et al. | 705/39 |
| 5,696,906 | 12/1997 | Peters et al. | 705/34 |
| 5,715,169 | 2/1998 | Noguchi | 364/474.07 |
| 5,758,068 | 5/1998 | Brandt et al. | 395/186 |
| 5,790,664 | 8/1998 | Coley et al. | 380/4 |
| 5,870,726 | 2/1999 | Lorphelin | 705/40 |

FOREIGN PATENT DOCUMENTS

| | | |
|---|---|---|
| A-59-41061 | 3/1984 | Japan . |
| A-61-267821 | 11/1986 | Japan . |
| A-63-153633 | 6/1988 | Japan . |
| A-63-289660 | 11/1988 | Japan . |
| A-63-310044 | 12/1988 | Japan . |
| A-1-147622 | 6/1989 | Japan . |
| A-1-173213 | 7/1989 | Japan . |
| A-3-8090 | 1/1991 | Japan . |
| A-3-10827 | 5/1991 | Japan . |
| A-3-288227 | 12/1991 | Japan . |
| A-5-68250 | 3/1993 | Japan . |
| A-5-134949 | 6/1993 | Japan . |
| A-5-207464 | 8/1993 | Japan . |
| B2-6-19707 | 3/1994 | Japan . |
| A-6-259248 | 9/1994 | Japan . |
| A-7-129271 | 5/1995 | Japan . |
| A-7-175599 | 7/1995 | Japan . |
| A-7-191843 | 7/1995 | Japan . |
| A-7-234785 | 9/1995 | Japan . |
| A-7-244585 | 9/1995 | Japan . |
| A-8-6660 | 1/1996 | Japan . |
| A-8-6784 | 1/1996 | Japan . |
| A-8-30451 | 2/1996 | Japan . |
| A-8-76994 | 3/1996 | Japan . |
| A-8-95777 | 4/1996 | Japan . |
| A-8-123681 | 5/1996 | Japan . |

*Primary Examiner*—Allen R. MacDonald
*Assistant Examiner*—Penny Caudle
*Attorney, Agent, or Firm*—Oliff & Berridge, PLC

[57] ABSTRACT

An operation management system for managing the operation of a managed software product. When a management target function is executed, reference is made to a battery value and, if the value is zero or greater, the function is allowed to be executed. The battery value is decremented as the function is executed. A charge value is supplied on a charge disk, such as a floppy disk, to allow the user to increase the battery value and to extend the usage period of the managed software product. The charge value may be supplied over a communication line.

19 Claims, 14 Drawing Sheets

SYSTEM CONCEPTUAL DIAGRAM (MEDIA USED)

| 40 HISTORY TABLE | | |
|---|---|---|
| FD SERIAL NO. 40A | CHARGE DATE/TIME 40B | CHARGED VALUE 40C |
| ------- | ------- | ------- |

Fig. 5

| 44 USAGE AMOUNT TABLE | |
|---|---|
| FUNCTION NAME 44A | USAGE AMOUNT (WEIGHT VALUE) 44B |
| ------- | ------- |

Fig. 4

MANAGEMENT TARGET FUNCTION EXECUTION
(WEIGHT VALUE BASED METHOD)

80 USER REGISTRATION TABLE

| ID | USER NAME | REQUESTED CHARGE VALUE |
|---|---|---|
| 80A | 80B | 80C |
| ------- | ------- | ------- |

Fig. 13

OPERATION MANAGEMENT SYSTEM AND OPERATION MANAGEMENT METHOD

BACKGROUND OF THE INVENTION

1. Field of the Invention

This invention relates to an operation management system and an operation management method, and more particularly to software operation management or execution management.

2. Description of the Related Art

As computers and computer use become more common, more advanced technology is introduced and a variety of software products are developed for use in various fields. However, in many cases, the user finds it difficult to select a product from among a variety of software products that seem to meet the user's requirements; often, the user cannot find the best tool for his needs.

To reduce such a risk, a service has been available that supplies the user with a trial-use software product free of charge. However, most of these trial-use software products contain only function descriptions or provide the user with limited functions (e.g., save function and/or output function is/are not included). This makes it difficult for the user to evaluate the actual product (all the functions) correctly.

A sales system which charges the user according to how long the user actually uses a software product (including a trial use) would allow him to buy the product anytime he wants, to fully evaluate the product, and to precisely determine the requirements for continued use (including payment for it). Many users would find this type of sales system appealing and economical.

In Japanese Patent Laid-Open Publication No. Sho 59-41061 and Japanese Patent Laid-Open Publication No. Sho 63-153633, a system is disclosed that automatically prevents a program from being used when the usage count reaches a specified value. In Japanese Patent Laid-Open Publication No. Hei 1-147622 a system is disclosed which accumulates program execution time (total program execution time) and prevents the program from being used when the accumulation time reaches a specified amount. However, these systems do not disclose means for extending the program usage period. Japanese Patent Laid-Open Publication No. Hei 5-134949 discloses a system in which a program and expiry of the program are downloaded from a host computer to a user computer via a communication line. Also disclosed is a system in which a new expiry of the program is downloaded from the host computer to the user computer in order to update the expiry. However, the system only measures the execution time taken for executing the entire program, and does not include any means for changing the expiry on the user computer.

In Japanese Patent Laid-Open Publication No. Hei 7-234785, a system is disclosed that relates to a software rental system. This system connects a computer in a rental company to a user computer on which a rental software product is running over a communication line. When the time elapsed from the rental start time reaches the rental limit time, the system makes the program unavailable for use. (For example, the program is deleted.) To allow the user to update the rental period, the rental company sends a rental period extension program to the user's computer over a communication line. The user runs this program to extend the rental period of the program. A drawback of this system is that the user must pay for the software product regardless of whether the user has used it frequently or not. This means that the amount of money the user has to pay depends, not on how often he has used it, but on how long he has used it.

In Japanese Patent Laid-Open Publication No. Hei 7-244585, a system is disclosed that manages the program usage period. This system assigns a usage limit date to a program and, when the current date becomes greater than the limit date, the program product is made unavailable. To extend the usage limit date, the system reads update limit data from a recording medium containing that data and re-assigns a usage limit date based on the update limit data. This system is not reasonable because the amount of money the user has to pay does not depend on whether or not the user actually uses the program.

For example, during execution of a Computer Aided Design (CAD) software product, the user often spends much time thinking without entering data. In the system disclosed by the above mentioned Japanese Patent Laid-Open Publication No. Hei 7-234785 or Japanese Patent Laid-Open Publication No. Hei 7-244585, the user must pay for this thinking time. This places unwanted pressure on the user, especially when he must think carefully during program execution.

SUMMARY OF THE INVENTION

The present invention seeks to solve the problems associated with the art described above. In view of the foregoing, it is an object of the present invention to provide an operation management system and method which reasonably manage the operation of a managed software product.

It is another object of the present invention to provide an operation management system and method which levy a charge according to the actual usage amount of the managed software product (or the amount of the result generated by the managed software product).

It is still another object of the present invention to provide an operation management system and method which manage the operation according to the property of each function of the managed software product.

(1) To achieve the above objects, an operation management system for managing the operation of a managed software product according to the present invention comprises: battery value management means for decrementing a battery value according to the operation amount of the managed software product; operation limit means for limiting the operation of the managed software product when the battery value has decreased to a specified limit value; and charge means for adding a charge value to the current battery value when the charge value is entered from external means.

The "battery value" mentioned above is a "virtual battery" which drives a managed software product. This battery value is preferably the value of a counter.

The battery value management means decrement the battery value according to the operation amount of the managed software product. When the battery value has reached a specified limit value (for example, 0), the operation limit means limit all of or a part of the operation of the managed software product. Upon receiving a charge value (additional battery value) from the external means, the charge means add the received value to the current battery value, thus extending the operation period. That is, the battery value is incremented, just as a battery is charged, to allow the continued use of the managed software product.

The managed software product described above is preferably a packaged application software program including a CAD program, game program, video program, language processor, music program, communication program, or a measurement program.

The battery value management means, operation management means, and charge means described above should be implemented preferably as software programs (management software programs) that run on a computer. The managed software product and the management software product may be separate, or the whole or a part of the management software product may be included in the managed software product.

A system according to the present invention is implemented on a general-purpose computer or special-purpose computer having such peripheral units as a disk drive, display, and input unit. The external means described above include recording media such as a magnetic disk or an optical disk and other host computers connected over a network.

(2) An operation management system according to the present invention may be applied to an application software product sales system. The following explains an example:

A vendor sells an application software product containing the operation management program according to the present invention. The operation management program has a battery value defined as the initial value. In addition to this product, the vendor sells recording media containing charge values (e.g., floppy disk (FD)). In this case, it is desirable that a variety of recording media, each containing a unique charge value, be supplied.

On the other hand, a user who bought the application software product may use the product until the battery value reaches zero. This allows the user to fully evaluate and examine the product. A user who wants to use the product after the battery value becomes zero must buy a recording medium containing a charge value to charge the battery. This enables him to add a charge value to the battery value and to use the product continuously.

If the specifications of the application software product do not satisfy the user's request, the user does not buy the recording medium. This prevents additional charges and reduces the cost to the user.

Considering an increase in the sales profit in recording media that will be produced in the future, a combination of a managed software product and the operation management program will lower prices significantly. The operation management system according to the present invention will increase the profits of both the user and the vendor, making it possible to build a very reasonable, economical system.

(3) In a preferred embodiment of the present invention, the battery value management means calculate the operation amount of each function of the managed software product, and subtracts a value corresponding to the operation amount from the battery value.

A continuous decrease in the battery value during execution of a managed software product, as in a conventional system, decrements the value even when the user is idle (input wait time), which places pressure on the user.

Calculating the operation amount of each function during execution of a managed software product, as in a system according to the present invention, decreases the battery value only when the managed software product is actually used, enabling the user to do operation without having to worry about time elapsed while thinking.

(4) In a preferred embodiment of the present invention, function category determination means are also available which determine if an execution instruction from the user activates a management target function or a management non-target function. And, the battery value management means decrement the battery value only when the management target function is executed.

For example, with the data generation function defined as a management target function and with other functions as management non-target functions, a cost can be levied only when new data are generated.

(5) In a preferred embodiment of the present invention, the battery value management means have a weight table containing an operation amount weight value for each of the management target functions. When any of the management target functions is executed, the battery value management means decrement the battery value by the weight value corresponding to the management target function.

In a preferred embodiment of the present invention, the battery value management means measure the execution time of each of the management target functions and decrement the battery value by the value corresponding to the execution time.

This weight value system is able to calculate the operation amount regardless of the computer speed, which may differ among computers. In addition, by measuring time in this manner, the execution time is directly monitored and therefore the operation mount becomes proportional to the CPU load.

(6) In a preferred embodiment of the present invention, the operation limit means prevent only the management target functions from being executed when the battery value has decreased to a specified limit value; management non-target functions are executed.

For example, forcing a game program used at home to terminate when the battery value has reached a specified value does not cause a serious problem.

However, for a CAD program used in an office, forced termination when the battery value has reached a specified value may make already-produced data unavailable, possibly interrupting a job. Therefore, considering user's advantage and convenience, the embodiment keeps some functions operable even when the battery value has reached a specified value.

(7) A preferred embodiment of the present invention has remainder warning means for issuing a remainder warning message when the battery value has decremented to a specified warning value because a sudden inoperable condition in the managed software product without prior notice may cause the user unexpected damage. The remainder warning means alert the user to that condition before it occurs. In other words, the warning message prompts the user to determine whether to charge the battery value.

A preferred embodiment of the present invention has remainder display means for displaying the battery value on the screen during execution of the managed software product. This remainder display information keeps the user informed of the amount by which the managed software product will be able to continue operation without being charged.

It is also possible to program the system so that, upon detecting that the battery value has been charged to a specified value, the system can automatically disable operation management through the battery value to allow the user to use the product indefinitely.

(8) To achieve the above objects, a method for managing the operation of a managed software product according to the present invention comprises: a count value management step for changing a count value according to the operation amount of the managed software product; an operation limit step for limiting the operation of the managed software product when the count value has reached a specified limit value; and a charge step for charging the current count value or the limit value when a charge value is entered from external means.

The above count value is incremented or decremented according to the operation amount of the managed software product. When the count value is incremented, a charge value is added to the limit value; when the count value is decremented, a charge value is added to the current count value. In either case, the usage period is extended by charging the battery value.

BRIEF DESCRIPTION OF THE DRAWINGS

FIG. 4 is a diagram showing an example of the history table.

FIG. 5 is a diagram showing an example of the usage amount table.

FIG. 13 is a diagram showing an example of the user registration table.

DESCRIPTION OF PREFERRED EMBODIMENTS

Figure 1:
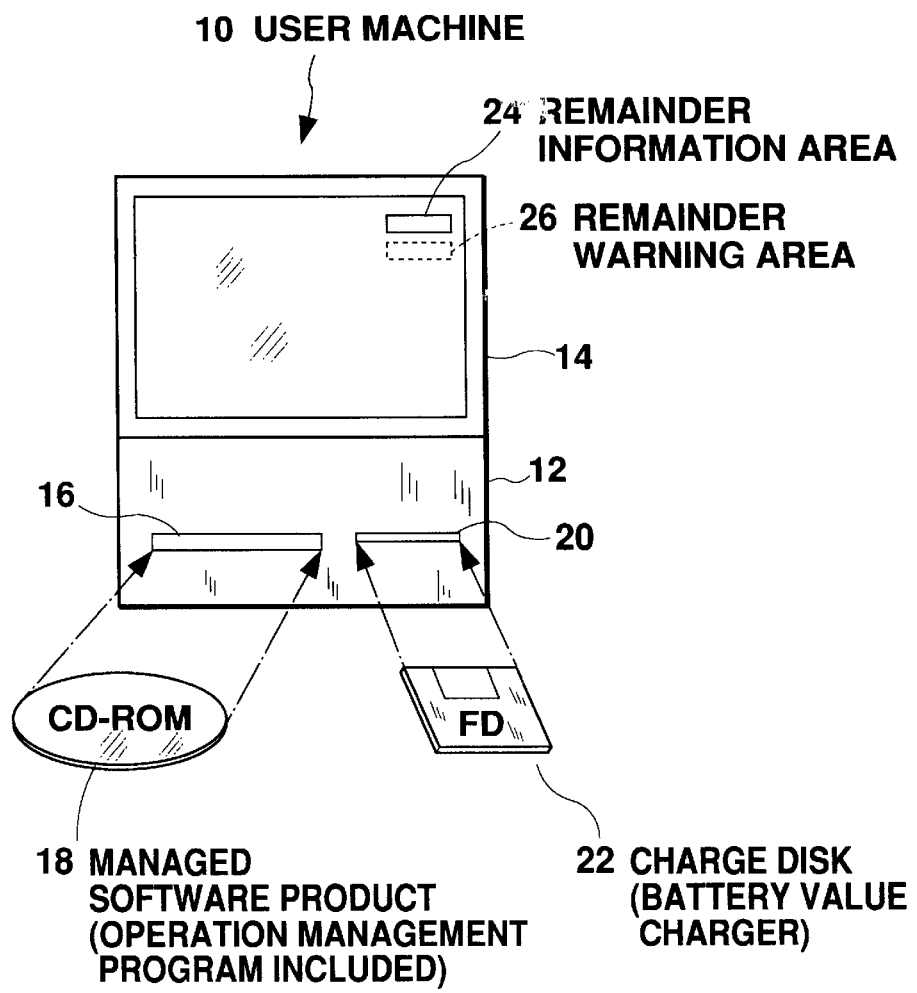
FIG. 1 is a diagram showing a user machine used in the operation management system according to the present invention.

FIG. 1 shows a user machine 10. This user machine 10 is a computer which executes various types of application programs under control of the operation system (OS). The user machine 10 is composed of a system unit 12, display 14, keyboard (not shown in the figure), output unit (not shown in the figure) such as a printer or plotter, and so forth. The system unit 12 contains a CD-ROM disk drive 16 which accesses a CD-ROM and reads data from it and a floppy disk drive 20 which accesses a floppy disk (FD) and reads data from it.

The CD-ROM shown in FIG. 1 contains a managed software product 18. In this embodiment, the managed software product 18, such as a CAD software product, has an operation management program built in. The operation management program, designed for managing the operation of the managed software product 18, manages the operation using a "battery value" which will be described below. In the example shown in FIG. 1, the managed software product 18 is installed from the CD-ROM to the user machine 10; it may be installed from any other recording medium or via a communication line.

A charge disk 22, containing specified data (including a charge value) on a floppy disk, functions as a battery value charger. Inserting this charge disk 22 into the floppy disk drive 20 causes a charge value to be read and enables the user to extend the allowable operation period of the managed software product 18. In this embodiment, several charge disks 22, each containing a unique charge value, are supplied to allow the user to select or buy a desired charge disk 22 to add a desired charge value to the battery value.

The managed software product 18 and the charge disk 22 are usually supplied from the same vendor. In this embodiment, the managed software product 18 includes the operation management program. Of course, the managed software product 18 and the operation management program may be separately loaded into the user machine 10.

In FIG. 1, the display 14 has a remainder information area 24 where remainder information is displayed and a remainder warning area 26 where a warning message is displayed when the remainder drops below the specified amount. These areas will be described later.

Figure 2:
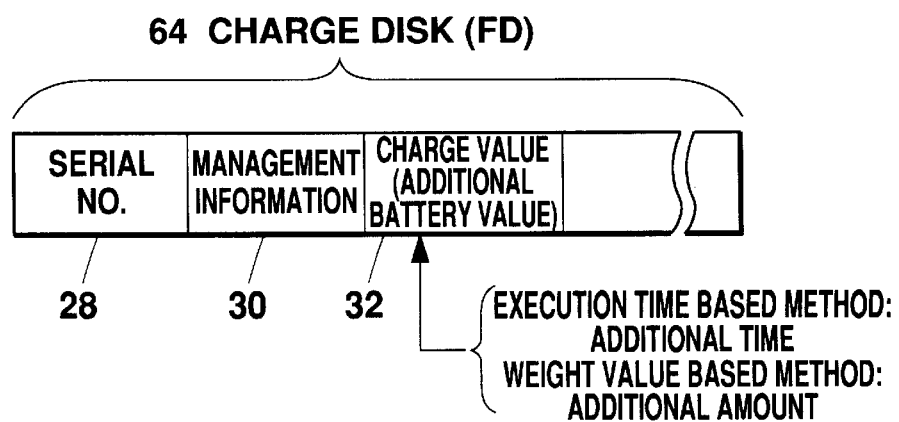
FIG. 2 is a diagram showing the data structure of a charge disk.

FIG. 2 shows the data structure of the charge disk 22. As shown in FIG. 2, the charge disk 22 contains a serial number 28, management information 30, and charge value (additional battery value) 32. The serial number 28 is a unique identification number that is assigned when the floppy disk is formatted. Usually, this number is not copied when the disk is copied. The management information 30 is created when the serial number 28 is encrypted. This management information 30 is copied when the disk is copied. Therefore, when the disk is copied illegally, the serial number 28 and the management information 30 do not match, thereby making it easy to determine that the disk is copied illegally. Of course, any other conventional security system may also be used instead of this method.

The charge value 32 is an additional charge value to be added to the battery value that is decremented as the user uses the managed software product 18. Charging the battery value with this charge value enables the user to extend the usage period.

When the battery value is managed in the "execution time based method" in which the battery value is decremented by the execution time of each function, an additional time is recorded as the charge value 32. On the other hand, when the battery value is managed in the "weight value based method" in which the battery value is decremented by the weight value of each function, the additional value is recorded as the charge value 32. These methods will be described in more detail later.

Although a floppy disk is used as the charge disk 22 in the embodiment shown in FIG. 1, other types of recording media may also be used. Also, as shown in another embodiment that will be explained later, a charge value may be sent over a communication line.

Figure 3:
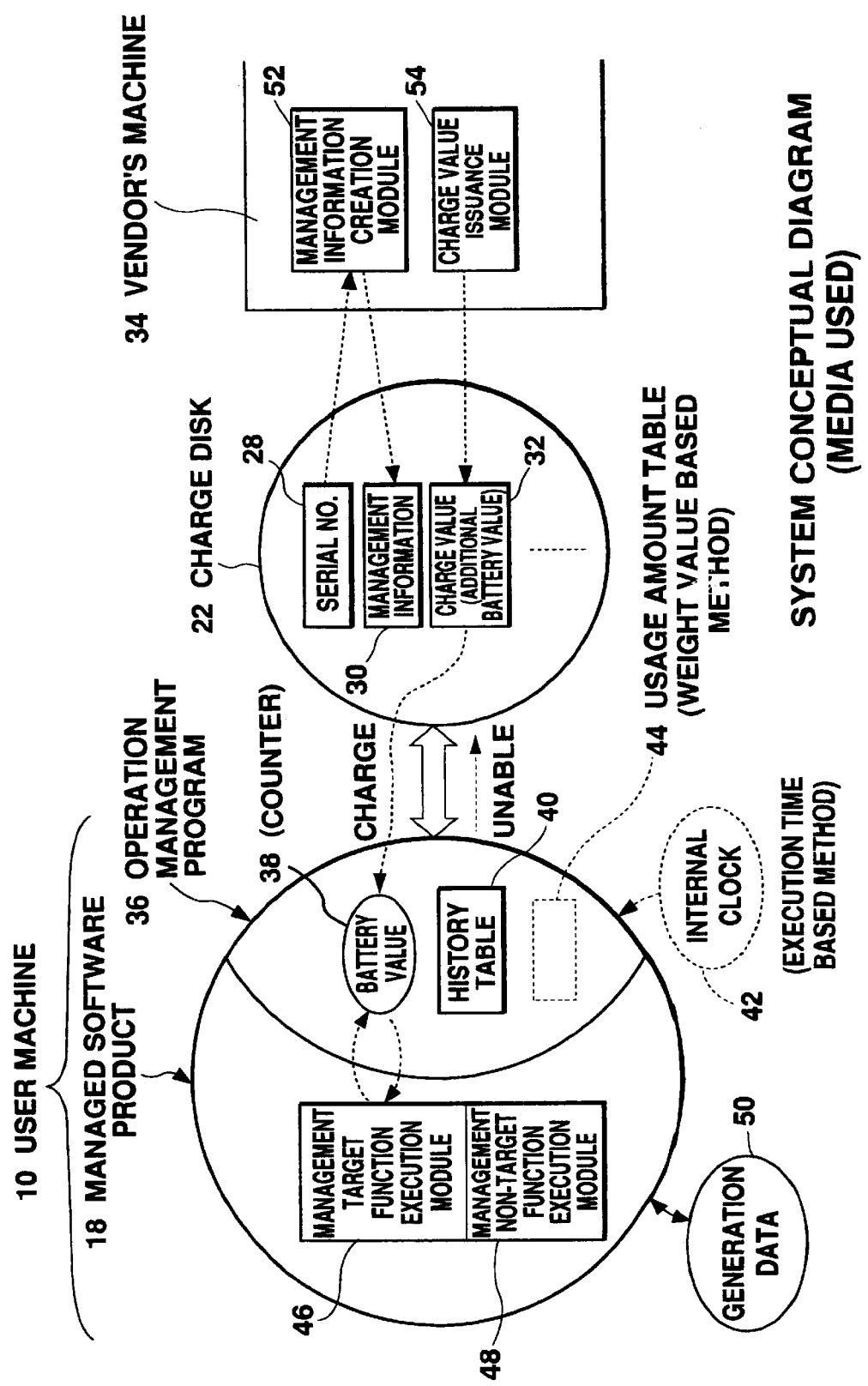
FIG. 3 is a diagram showing the concept of the operation management system according to the present invention.

FIG. 3 shows the concept of the operation management system which uses the charge disk 22. The system is composed primarily of the user machine 10, charge disk 22, and vendor's machine 34. In this embodiment, the managed software product 18 including the operation management program 36 is installed in the user machine 10.

The charge disk 22 is generated on the vendor's machine 34 owned by the vendor which sold the managed software product 18. more specifically, the vendor's machine 34 has two software modules: the management information creation module 52 and the charge value issuance module 54. The management information creation module 52 encrypts the serial number 28 recorded on the charge disk 22, and writes the resulting management information 30 back onto the charge disk 22. Note that the operation management program 36, which contains the encryption condition or the decryption condition, can check whether or not the serial number 28 agrees with the management information 30. The charge value issuance module 54 records the charge value 32, which has been set by the vendor, onto the charge disk 22. In the execution time based method, the charge value 32 is recorded, for example, as 100 hours, 200 hours, or 500 hours. Note that the operation management program 36 contains an initial battery value (for example, 100 hours).

The operation management program 36 has a counter 38 which decrements the battery value (battery value management function). In this embodiment, the operation management program 36 decrements the counter 38 each time a "management target function" provided by the managed software product 18 is executed. When the battery value, i.e., the counter value, has decremented to the limit value of 0, the operation management program 36 prevents management target functions from being executed. That is, in this embodiment, when the battery value has reached a specified limit value, the execution of the managed software product 18 is limited and, when the battery value is charged with the charge value 32 contained on the charge disk 22, the charge value is added to the battery value and the resulting value is used as a new battery value. The usage period of the managed software product 18 is thus extended.

A history table 40 managed by the operation management program 36 contains history information on charge values recorded on the charge disk 22. FIG. 4 shows an example. As shown in FIG. 4, the history table 40 is composed of three columns: FD serial number column 40A, charge data/time column 40B, and charge value column 40C. The table may have other columns as necessary.

Referring to FIG. 3 again, the following explains how the battery value is managed. When the battery value is managed in the "execution time based method" described above, the execution time of each management target function, measured based on the internal clock 42, is subtracted from the battery value. On the other hand, when the "weight value based method" described above is used, the battery value is managed based on the usage amount table 44. FIG. 5 shows an example of the usage amount table 44. In this embodiment, the table contains entries, each consisting of a function name 44A and the corresponding usage amount 44B. It should be noted that each usage amount is used as a weight value. For example, a weight value is pre-defined according to the processing time of each function. Therefore, when a management target function is executed, the corresponding usage amount (weight value) is subtracted from the battery value.

The managed software product 18 shown in FIG. 3 has many user interface programs as well as many internal functions and common functions used by the programs. These functions are classified roughly into two: management target functions and management non-target functions. Whenever the managed software product 18 attempts to execute a management target function, the operation management program 36 references the battery value and, when it is zero or greater, allows the managed software product 18 to execute that function. When the managed software product 18 attempts to execute a management non-target function, the operation management program 36 does not check the battery value. For example, when input/output function for processing generated data 50 from the managed software product 18 is defined as a management non-target function, the input/output processing is always executed on the generated data 50, even if the usage period of the managed software product 18 has expired. This ensures that the generated data 50 are always processed, thus protecting user assets. Examples of management non-target functions include the data display function, data print function, and data plotter output function.

Management target functions include the data generation function. For example, when the managed software product is a CAD software product, the data generation function includes the straight-line drawing function, curved-line drawing function, circle drawing function, area fill-in function, area hatching function, and character insertion function.

FIG. 3 conceptually shows management target function execution module 46 which executes management target functions and management non-target function execution module 48 which executes management non-target functions. In this embodiment, the battery value is decremented only when a management target function is activated. Note that the battery may be decremented when both a management target function and a management non-target function are activated.

In addition to the data described above, the charge disk 22 may contain other types of data. For example, it may contain the name of the managed software product 18 which accepts a charge value. In this case, the name of the managed software product 18 is used as follows. When the charge disk 22 is read, the operation management program 36 checks whether or not the name of the managed software recorded on the charge disk 22 matches that of the managed software product 18 installed in the user machine 10 and, only when they match, accepts the charge value 32.

The battery value described above is stored on the hard disk and then copied into the computer's RAM. The battery value in the RAM is decremented whenever a management target function is executed. Also, at an interval or as necessary, the battery value in the RAM replaces the battery value on the hard disk. This means that, even when the computer fails, the battery value is not erased. The battery value may also be maintained in some other way.

Figure 17:
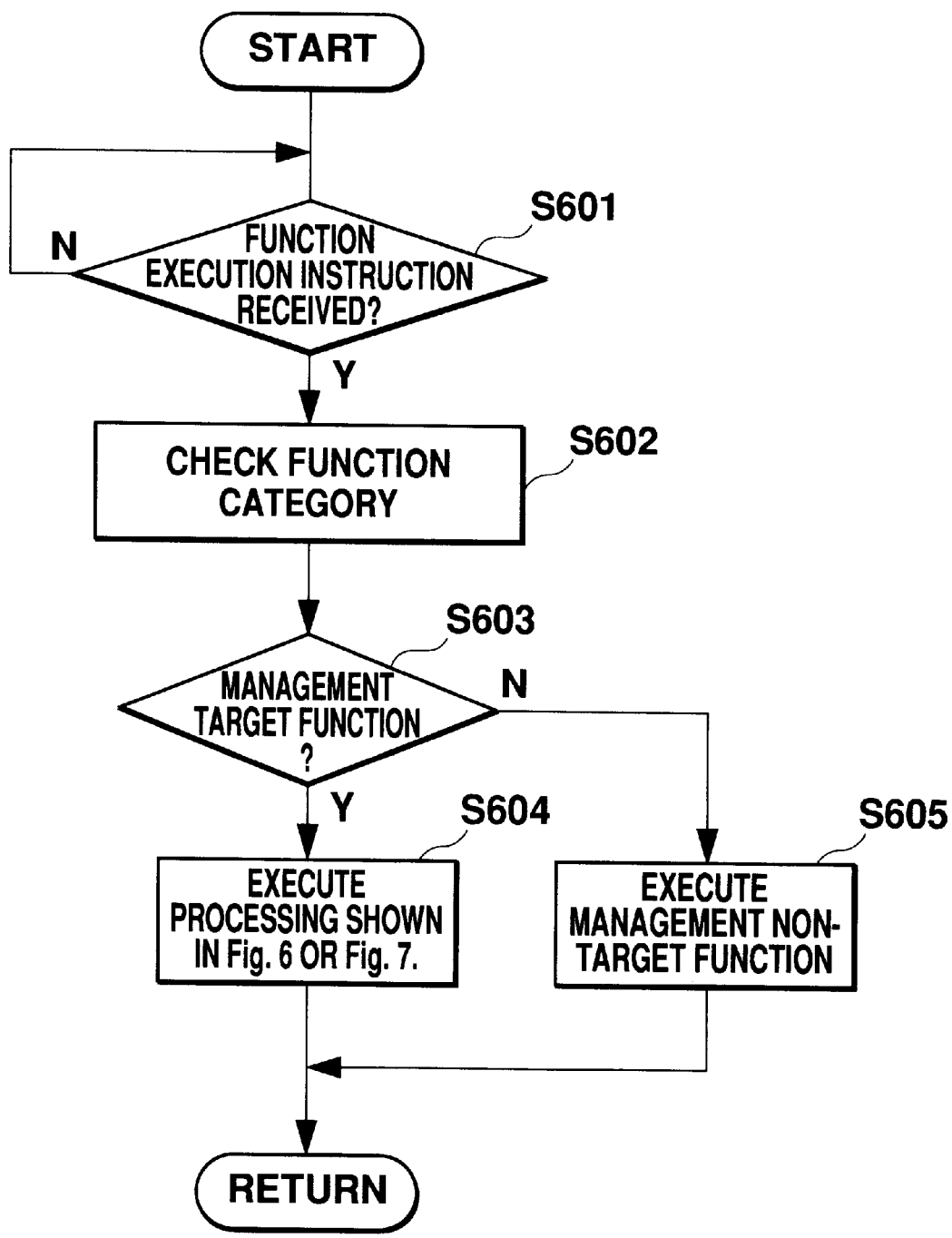
FIG. 17 is a flowchart showing the function category determination processing.

FIG. 17 is a flowchart showing how the operation management program operates when it accepts an instruction requesting the execution of a managed software product function. The following explains this processing in more detail.

Upon receiving from a user an instruction requesting the execution of a function of the managed software product while the managed software product is in execution (S601), the operation management program checks whether the requested function is a management target function or a management non-target function (S602). When the function is a management target function (S603), the operation management program performs the processing shown in FIG. 6 or FIG. 7 (S604). When the function is a management non-target function (S603), the program executes the function immediately. (S605). This processing is repeated whenever an execution instruction is received.

Figure 6:
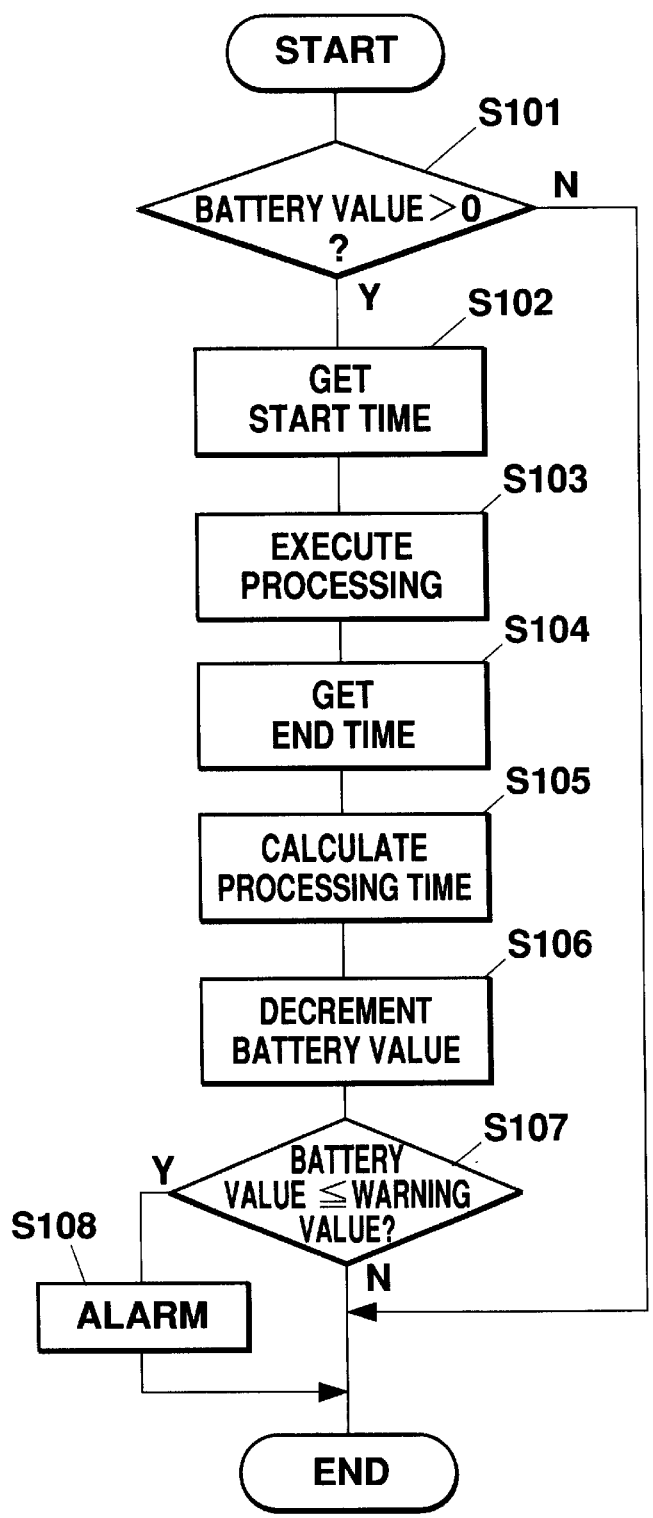
FIG. 6 is a flowchart showing the processing of the system when a management target function is executed in the execution time based method.

Next, referring to FIG. 3, the execution of a management target function in the execution time based method is explained with the use of FIG. 6.

When the user requests the execution of a management target function while the managed software product 18 shown in FIG. 3 is in execution, the routine shown in FIG. 6 is started. First, the management target function execution module 46 or the operation management program 36 reads the battery value to check if it is greater than zero. If the battery value is zero or less, the routine is terminated. That is, the requested management target function cannot be started. Note that a management non-target function is started even if the battery value is zero.

In S102, the routine gets the start time from the internal clock 42 before starting the requested management target function and, in S103, starts the management target function. In S104, the routine gets the end time from the internal clock 42 and, in S105, subtracts the start time from the end time to calculate the processing time (execution time) of the processing executed in S103.

In S106, the routine subtracts the processing time calculated in S105 from the battery value. In S107, the routine checks if the resulting battery value is equal to or less than the warning value and, if so, displays a message in the remainder warning area 26 shown in FIG. 1. If the resulting battery value is greater than the warning value, the routine does not display the message. As shown in FIG. 1, the remainder information area 24 is displayed during execution of the managed software product 18 (see FIG. 1) to allow the user to check the remaining amount. This helps the user determine how long he can execute the managed software product 18.

Figure 7:
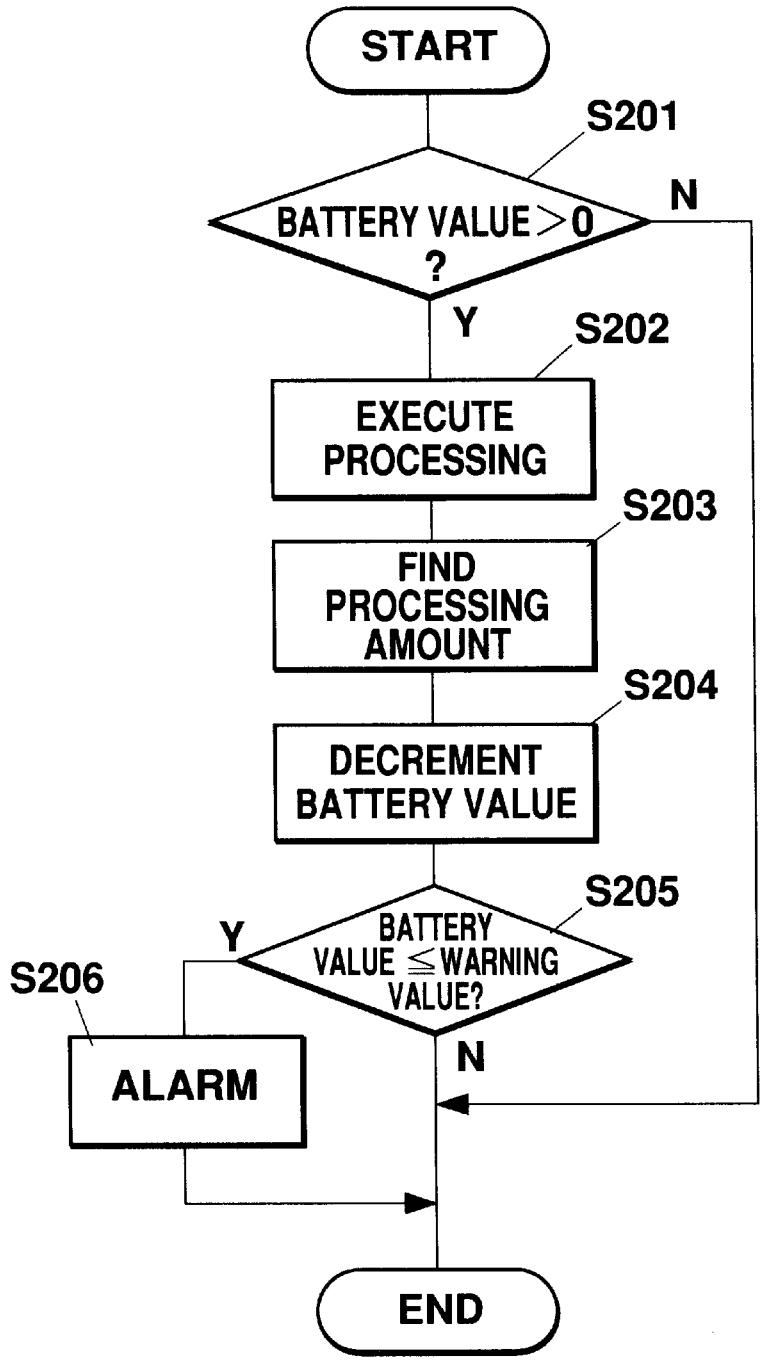
FIG. 7 is a flowchart showing the processing of the system when a management target function is executed in the weight value based method.

FIG. 7 shows the processing of a management target function in the weight value based method.

When the execution of a management target function is requested as described above, the routine references the battery value in S201 to check if it is equal to or greater than 0. If it is, the routine executes the requested management target function in S202 and, in S203, references the usage amount table 44 shown in FIG. 5 to find the usage amount (weight value) of the executed management target function. Then, in S204, the routine subtracts the processing amount found in S203 from the battery value to find a new battery value. In S205, the routine checks if the battery value is less than the warning value and, if so, displays a message in the remainder warning area 26 in S206.

The "execution time based method" shown in FIG. 6 allows the user to manage operation using a physical amount that is easy to understand. In addition, the user can manage operation in a relatively simple configuration. On the other hand, the "weight value based method" shown in FIG. 7 gives the user the same result regardless of the CPU speed of the user's machine.

Figure 8:
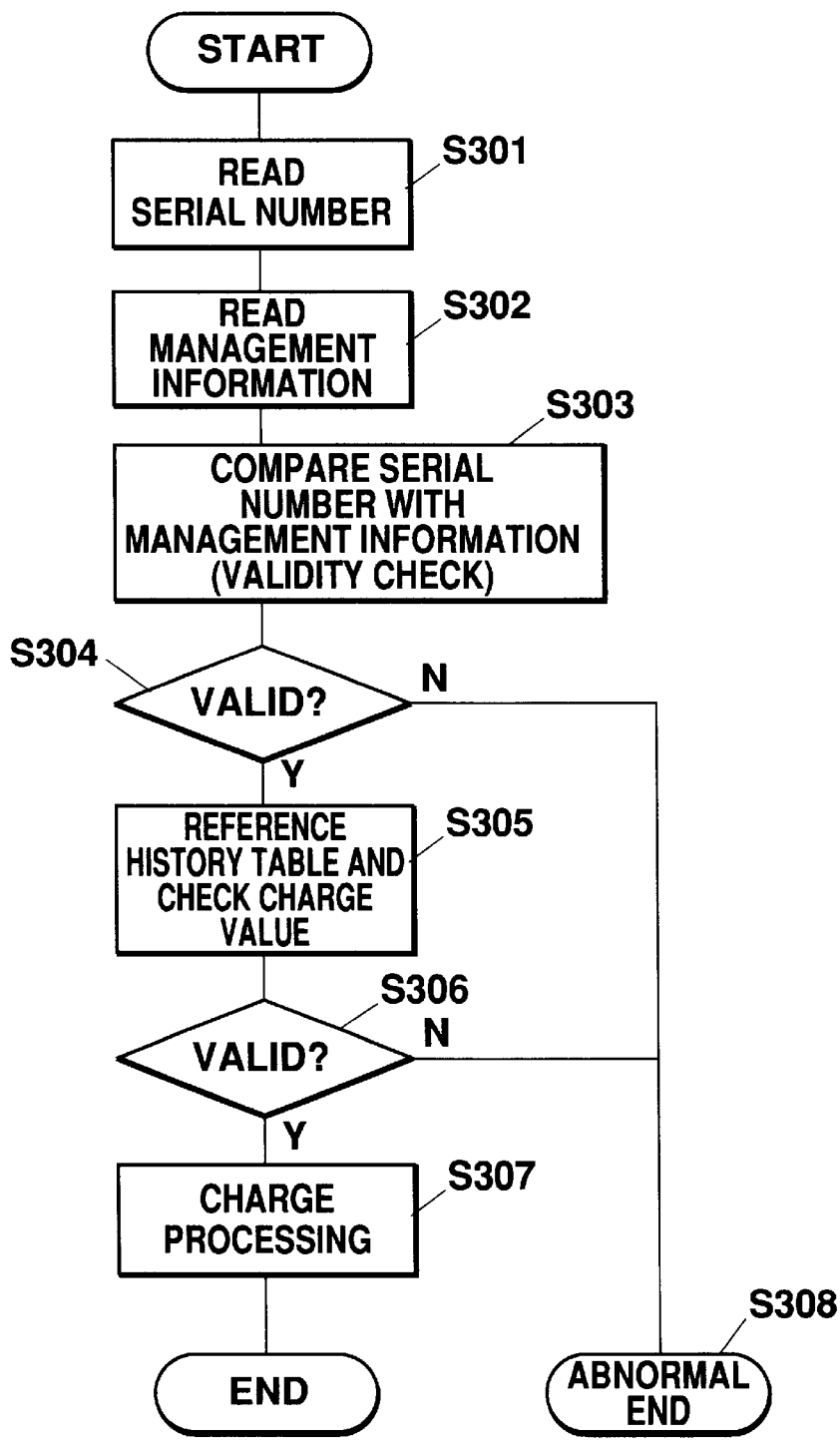
FIG. 8 is a flowchart showing the charge disk read processing.

Next, referring to FIG. 3, the charge disk 22 read processing is explained with the use of FIG. 8.

This processing is started when the charge disk 22 is inserted into the floppy disk drive 20 as shown in FIG. 1. The routine reads the serial number in S301, and the management information in S302, both from the charge disk 22. In S303, the routine encrypts the serial number according to the encryption condition, or decrypts the management information according to the decryption condition, and compares the serial number with the management information. This comparison determines whether or not the charge disk 22 is legal. For example, when the disk is illegally copied, the management information 30 is copied, but the serial number 28 is not copied but replaced. This results in a mismatch between the serial number 28 and the management information 30, thereby making it possible to find an illegal copy.

In S304, the routine checks if the charge disk 22 is valid and, if it is not valid, terminates processing in S308. If it is valid, the routine references the history table 40, containing past charge history data, in S305 to check the validity of the charge value 32 recorded on the charge disk 22. To do so, the routine first checks to see if the serial number 28 of the charge disk 22 is in the history table 40. If the serial number is found, the routine takes the following steps to check if the charge value 32 recorded on the charge disk 22 is valid. The routine finds the charge value initially recorded on the charge disk 22 and, from that initial value, subtracts the actual charge value to find the remainder. The next time the battery value is charged, the routine compares the remainder with the charge value currently recorded on the charge disk. If the charge value on the charge disk 22 is greater than the remainder, the routine determines in S306 that the charge disk is not valid and terminates processing in S308. If the routine finds that the charge value 32 on the charge disk 22 is valid, it performs the charge processing, shown in FIG. 9, in S307.

Figure 9:
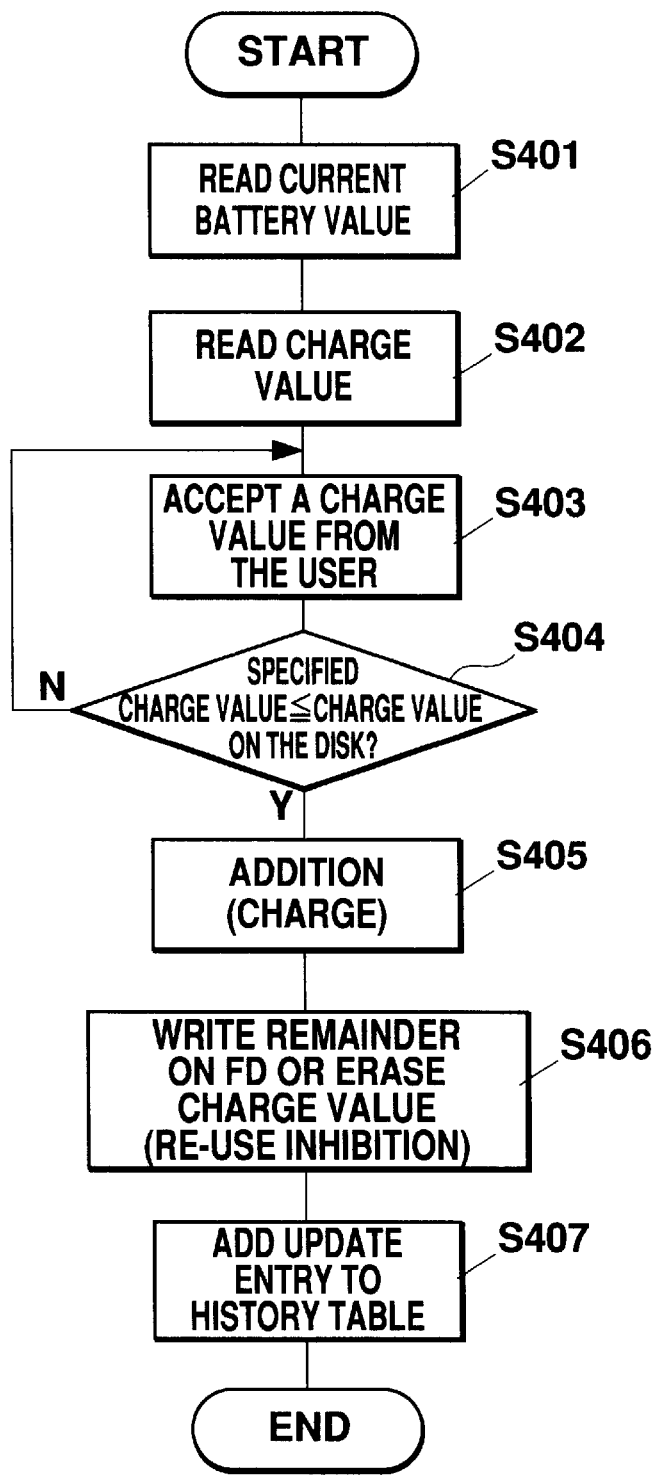
FIG. 9 is a flowchart showing the charge processing.

FIG. 9 shows an example of charge processing. In S401, the routine references the counter 38 to read the current battery value and, in S402, reads the charge value from the charge disk 22. In S403, the routine asks the user to type an actual charge value that does not exceed the charge value 32 recorded on the charge disk 22. The user types the charge value, for example, from the keyboard. In S404, the routine checks that the specified charge value is less than the charge value on the charge disk 22. If the specified charge value is greater than the charge value on the charge disk 22, the routine asks the user to retype the charge value.

In S405, the routine adds the specified charge value to the battery value, thus charging the battery value. In S406, the routine subtracts the specified charge value from the initial charge value and writes the resulting value on the charge disk 22 as a new charge value 32. If the initial charge value 32 is exhausted, the routine writes the value of 0 on the charge disk 22 to virtually erase the charge value. The value of 0 prevents the charge disk 22 from being re-used. In S407, a record relating to the charge processing is added to the history table 40.

In the above embodiment, the user specifies an actual charge value. Instead of having the user specify a value, a pre-defined charge value may be added to the battery value at that time.

Figure 10:
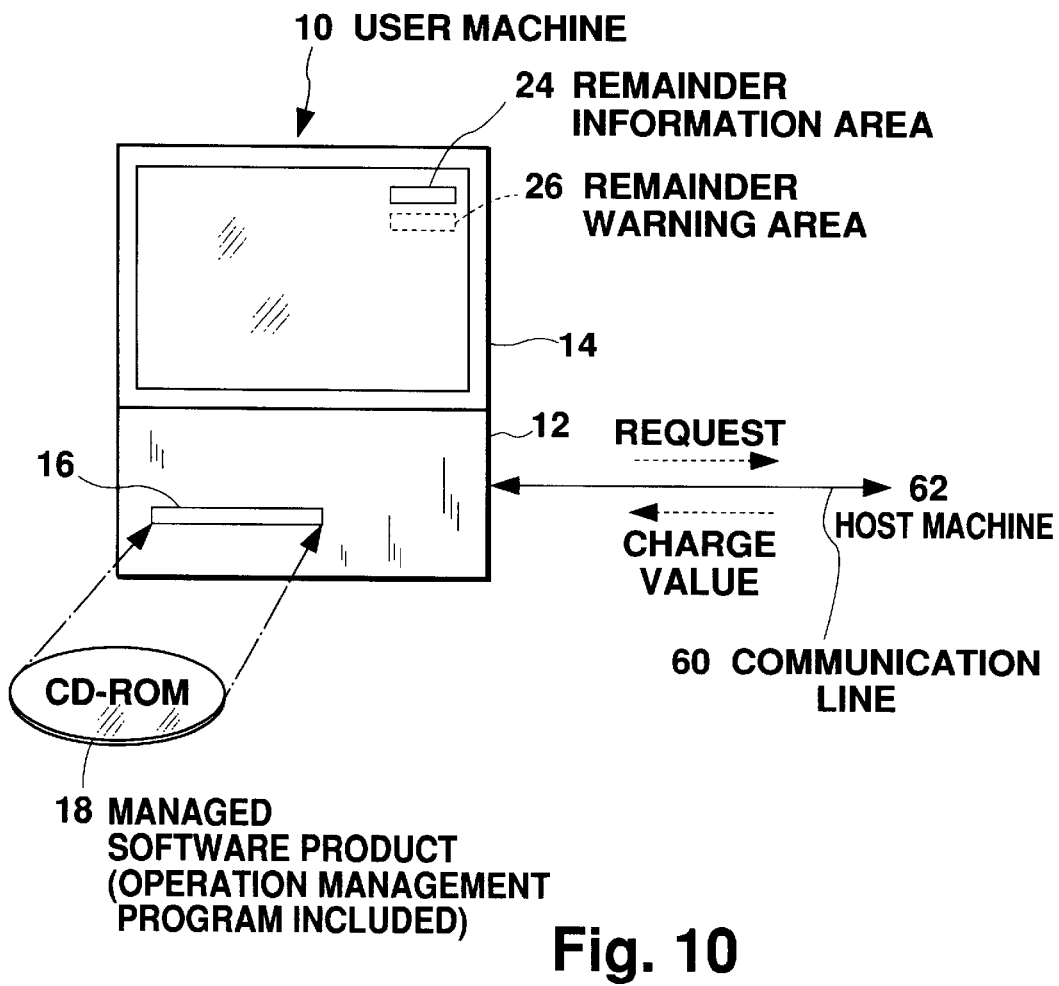
FIG. 10 is a diagram showing a user machine used in another embodiment.

FIG. 10 shows another embodiment according to the present invention. In the embodiment described above, the battery value is charged using a recording medium. In this embodiment, the battery value is charged via a communication line 60. For the same components as those used in the above embodiment, the same numbers are assigned and their descriptions are omitted.

The user machine 10 in FIG.10 is connected to the host machine 62 via the communication line 60. From this host machine 62, send data 64 shown in FIG. 11 are sent to the user machine 10 to charge the battery value.

Figure 11:
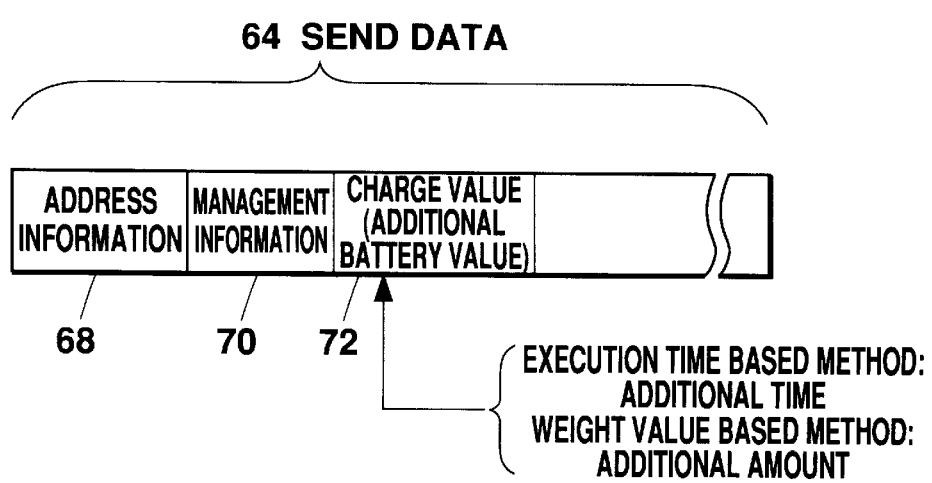
FIG. 11 is a diagram showing the structure of data sent from the host machine to a user machine.

In FIG. 11, address information 68 specifies the address of the user machine 10. Management information 70 is created by encrypting the serial number on the recording medium containing the managed software product 18. A charge value 72, a value to be added to the battery value as with the above embodiment, is an additional period of time in the execution time based method, and is an additional amount in the weight value based method.

Figure 12:
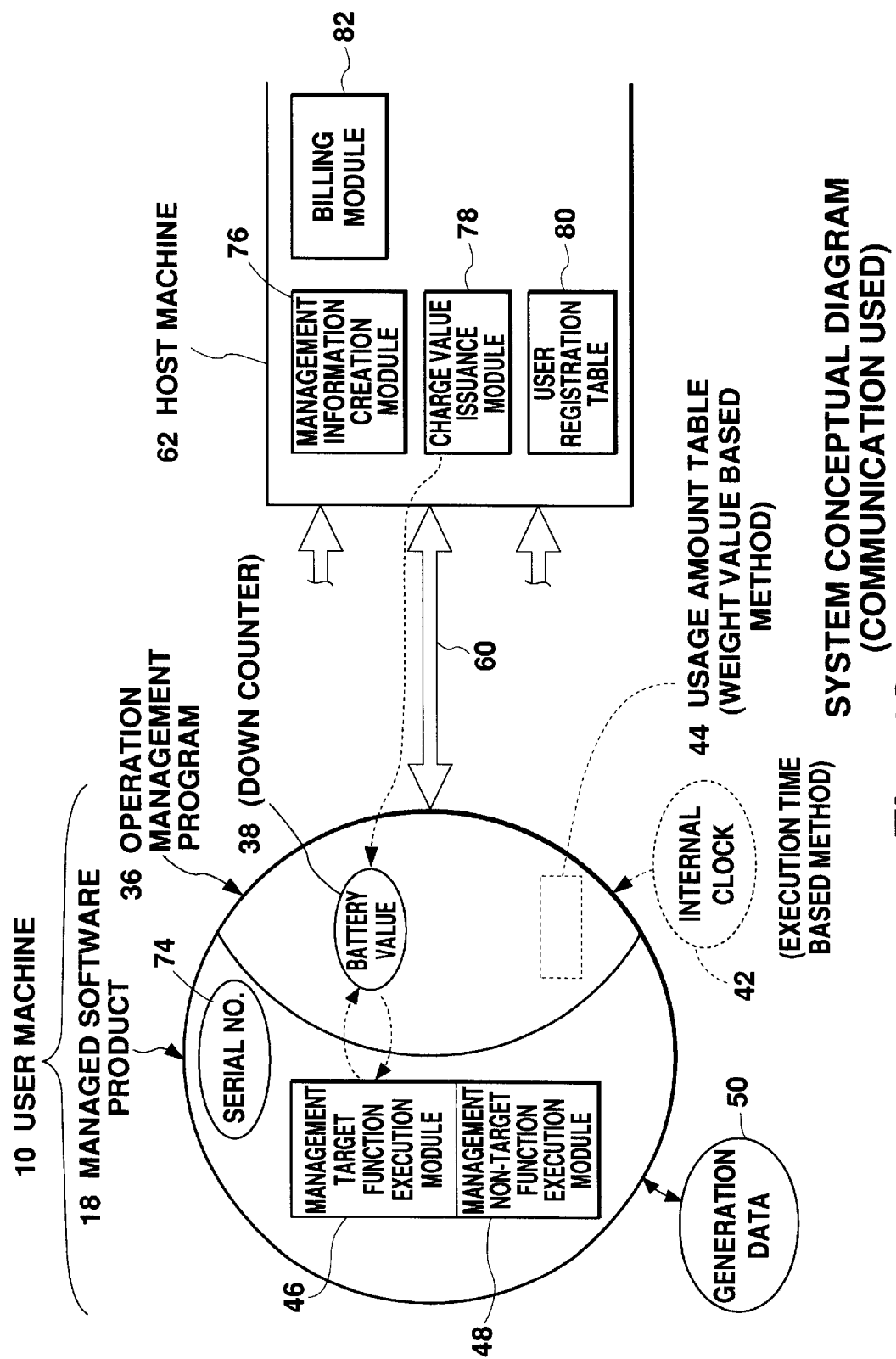
FIG. 12 is a diagram showing the concept of the system in another embodiment.

FIG. 12 illustrates the system concept of this embodiment.

As described above, the user machine 10 is connected to the host machine 62 via the communication line 60. That is, this host machine 62 is connected to each of a number of user machines 10 for integrated operation management. This host machine 62 has a management information creation module 76, charge value issuance module 78, user registration table 80, and billing module 82. The management information creation module 76 creates the management information 70 shown in FIG. 11, and the charge value issuance module 78 issues a charge value 72 in response to a request from the user machine 10. As shown in FIG. 13, the user registration table 80 is composed primarily of the user ID column 80A, user name column 80B, and request charge value column 80C. The billing module 82 references the user registration table 80 to automatically issue a bill for a requested amount whenever a charge value is issued, or at some specified interval.

Figure 14:
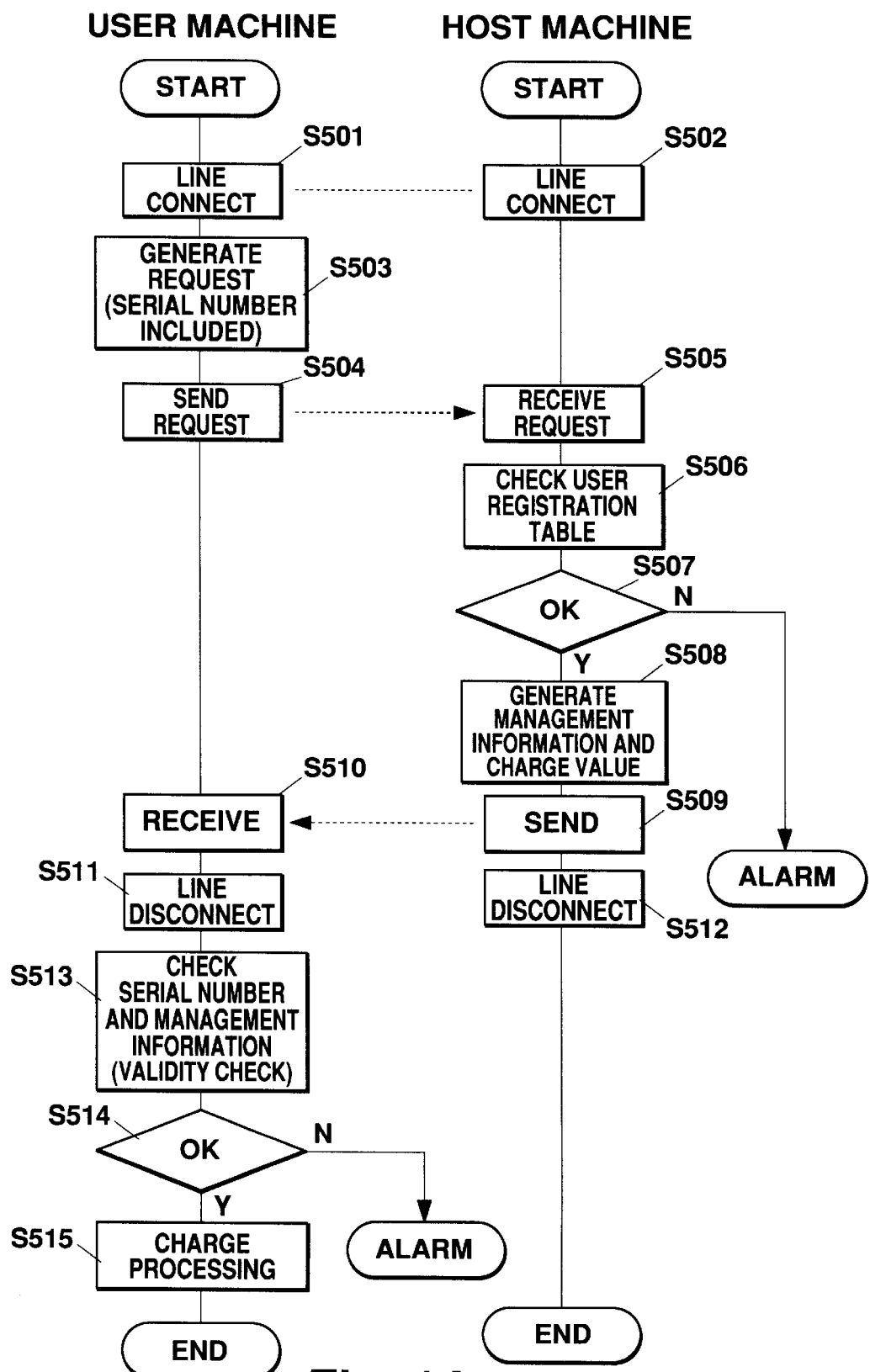
FIG. 14 is a flowchart showing the operation of the user machine and a user machine in another embodiment.

Next, referring to FIG. 12, the operation of this embodiment is explained with the use of FIG. 14. The operation of the user machine 10 is shown in the left side of FIG. 14, while that of the host machine 62 is shown on the right.

First, in S501 and S502, the user machine 10 is connected to the host machine 62 via a communication line. In S503, the user machine 10 generates a request for a charge value that will be sent to the host machine 62. In this case, the request contains at least the serial number of the CD-ROM containing the managed software product 18 and information on the charge value. In S504, the user machine sends the request to the host machine and, in S505, the host machine receives the request.

In S506, the host machine checks the user registration table 80. If the host machine finds, in S507, that the requesting user is registered in the host machine 62, the management information creation module 76 creates management information based on the serial number in S508, and the charge value issuance module 78 generates a charge value in response to the request from the user. In S509, the host machine 62 sends the management information and the charge value to the user machine 10 as the send data 64 shown in FIG. 11. In S510, the user machine 10 receives the send data 64. In S511 and S512, the user machine 10 and the host machine 62 are disconnected.

In S513, the operation management program 36 compares the serial number 74 with the management information 70 to check to see if the data received by the user machine 10 are valid. This prevents the user from illegally charging the battery value. If it is found in S514 that the send data are valid, the charge processing is performed in S515. this charge processing is the same as that in FIG. 9.

As shown in FIG. 12, this embodiment may also use the execution time based method or the weight value based method in order to manage the battery value.

Although the battery value is charged over a communication line such as a telephone line in the above embodiment, it may also be charged over a communication satellite (satellite line).

Figure 15:
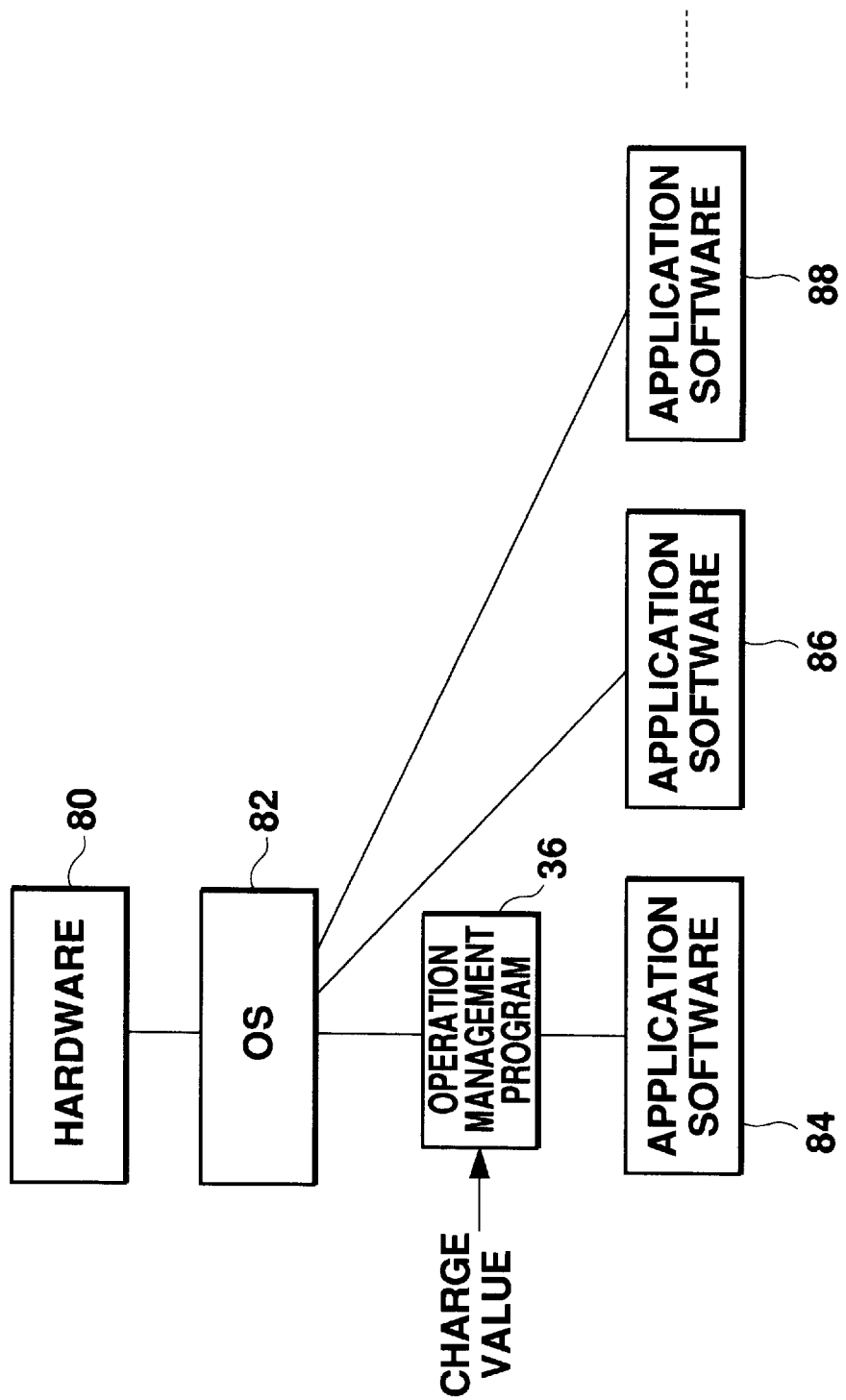
FIG. 15 is a diagram showing another configuration of the system.

In the above embodiments, the operation management program 36 is included in the managed software product 18. Of course, an external program can manage the operation of the managed software product 18. FIG. 15 shows the concept of such an embodiment.

As shown in FIG. 15, the operation system (OS) 83 is located between the hardware 81 and each of application programs 84, 86, and 88. The operation management program 36 according to the present invention may be located between the operation system 83 and the application program 84.

Operation management program 36 therefore functions as an interface program. Messages are exchanged between the operation management program 36 and the application program 84 according to some specific rule. Messages are also exchanged between the operation management program 36 and the operation system 83 according to a specific rule.

To execute a management target function in this configuration, the operation management program 36 references the battery value when it receives an execution request from the application program 84. If the battery value is not zero, the operation management program 36 sends an instruction to the operation system 83 while simultaneously decrementing the battery value by a value corresponding to the function. If the battery value is zero, the operation management program 36 sends a message back to the application program 84, indicating that the instruction cannot be executed.

To execute a management non-target function, the operation management program 36 does not reference the battery value when it receives an execution request from the application program 84 but instead sends the instruction directly to the operation system 83.

The battery value is decremented as management target functions are executed. Charging the battery value allows the user to extend the usage period of the application program 84, which may be supplied separately from the application program 84.

In the above embodiments, one operation management program manages one operation management program. It is also possible for one operation management program to manage several application programs.

Figure 16:
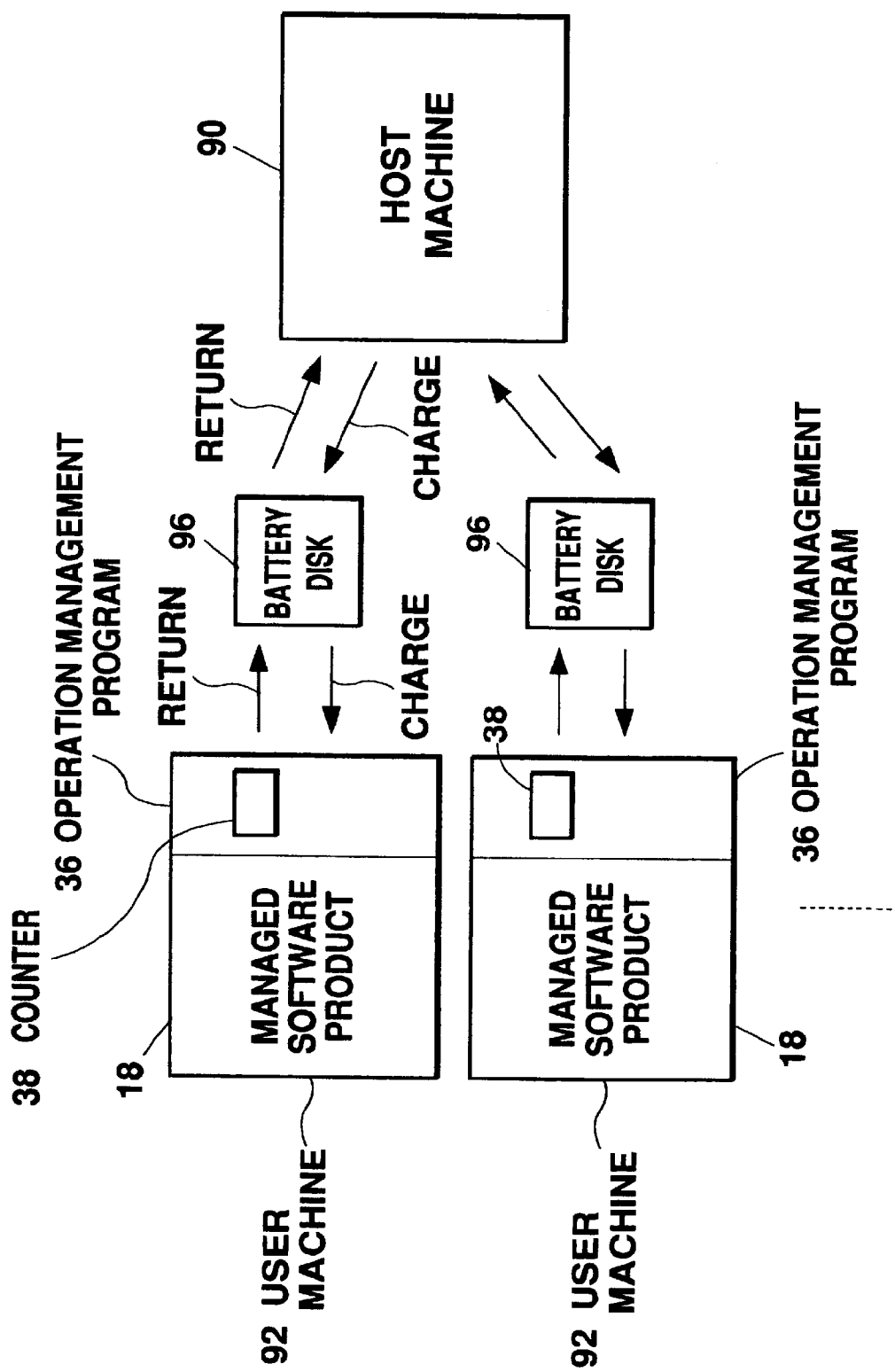
FIG. 16 is a diagram showing an example of an application according to the present invention.

FIG. 16 shows an application of the present invention. The system shown in FIG. 16 is composed of one host machine 90 and several user machines 92. Within each user machine 92 are a managed software product 18 and the operation management program 36, which, in turn, contains the counter 38 where the battery value to be decremented is stored. In other words, the operation of the managed software product 18 is controlled by the value stored in the counter 38. To execute the managed software product 18 in this system, it is necessary to insert a battery disk 96 into the user machine 92 and to move the battery value from the battery disk 96 into the counter 38. The battery value is decremented as the operation of the managed software product 18 proceeds. When the user finishes the managed software product 18, a sequence of operations are executed to move the current counter value from the counter 38 to the battery disk 96. This initializes the counter 38 to zero just as it was before the battery disk 96 was inserted.

The host machine 90 has several disk drives into which a battery disk 96 is inserted to read the battery value that was returned to the battery disk 96. This host machine 90 is also used to charge the battery value on the battery disk 96.

Integrated management of the battery values on several battery disks 96 through the host machine 90 brings a benefit of integrally managing several managed software products 18.

This type of system may be used, for example, in a school or a business where many computers are installed. With an individual carrying his or her own portable battery disk 96, it is possible to check and control the software usage amount of each person. In this case, either the "execution time based method" or the "weight value based method" may be used.

Although there have been described what are at present considered to be preferred embodiments of the invention, it will be understood that various modifications may be made thereto, and it is intended that the appended claims cover all such modifications as fall within the true spirit and scope of the invention.

What is claimed is:

1. An operation management system for managing the operation of a managed software product, comprising:
   battery value management means for decrementing a battery value according to the operation amount of said managed software product;
   operation limit means for limiting the operation of said managed software product when said battery value has decremented to a specified limit value; and
   charge means for adding a charge value to the current battery value when the charge value is entered from external means;
   wherein said battery value management means find the operation amount for each execution of a function owned by said managed software product and subtract a value corresponding to said operation amount from said battery value.

2. An operation management system according to claim 1, further comprising:
   function category determination means for determining if a function to which an execution instruction is issued is a management target function or a management non-target function, wherein said battery value management means decrement said battery value only when said management target function is executed.

3. An operation management system according to claim 2, wherein
   said battery value management means has a weight table containing pairs of said management target function and a weight value representing said operation amount thereof, and
   said battery value management means subtract a weight value corresponding to said management target function from said battery value when said management target function is executed.

4. An operation management system according to claim 2, wherein, when said management target function is executed, said battery value management means measure the execution time and subtracts the execution time from said battery value.

5. An operation management system according to claim 2, wherein said operation limit means prevent said management target function from being executed but allows said management non-target function to be executed when said battery value has reached a limit value.

6. An operation management system according to claim 2, wherein said managed software product has a data generation function and a data output function and wherein said function category determination means determine said data generation function as said management target function and determine said data output function as said management non-target function.

7. An operation management system according to claim 1, further comprising remainder warning means for issuing a remainder warning when said battery value has decremented to a warning value.

8. An operation management system according to claim 1, further comprising remainder display means for displaying said battery value during execution of said managed software product.

9. An operation management system for managing the operation of a managed software product, comprising:
   battery value management means for decrementing a battery value according to the operation amount for each execution of a function owned by said managed software product;
   operation limit means for limiting the operation of said managed software product when said battery value has decremented to a specified limit value;
   read means for reading a charge value from a recording medium containing the charge value thereon; and
   charge means for adding said charge value to the current battery value.

10. An operation management system according to claim 9, further comprising erase means for erasing the charge value from said recording medium after said charge value is added.

11. An operation management system according to claim 9, further comprising:
    specification means for allowing a user to specify an actual charge value by which the current battery value is to be actually charged, the actual charge value not exceeding the charge value recorded on said recording medium; and
    rewrite means for rewriting the charge value on said recording medium with a remainder value after said actual charge value is added to the current battery value.

12. An operation management system according to claim 9, in which said recording medium contains not only said charge value, but also the identification number of the recording medium and management information generated through encryption of the identification number, said operation management system further comprising:
    validity determination means for comparing said identification number with said management information considering the condition of said encryption to determine the validity of said recording medium.

13. An operation management system comprising:
    a managed machine containing a managed software product; and
    a managing machine connected to said managed machine with a communication line, wherein
    said managed machine comprises:
        battery value management means for decrementing a battery value according to the operation amount for each execution of a function owned by said managed software product;
        operation limit means for limiting the operation of said managed software product when said battery value has decremented to a specified limit value;
        charge value receive means for receiving a charge value from said managing machine; and
        charge means for adding said charge value to the current battery value, and wherein
    said managing machine comprises:
        charge value send means for sending said charge value to said managed machine over said communication line.

14. An operation management system according to claim 13, wherein said managed machine further comprises:
    notification means for notifying said managing machine of the identification number of a portable recording medium initially containing said managed software product; and
    validity determination means for comparing management information sent from said managing machine with said identification number to determine the validity of the recording medium; and wherein said managing machine further comprises:
        management information creation means for creating said management information generated by encrypting said notified identification number and for sending the management information to said managed machine.

15. An operation management system comprising:
- at least one managed machine containing a managed software product; and
- a managing machine for managing the operation of said managed machine, wherein said managed machine comprises:
  - a counter containing a battery value changing according to the operation amount of said managed software product;
  - first charge means for reading a battery value from a portable recording medium to store the battery value into said counter; and
  - first return means for writing the current battery value on said recording medium, and wherein,
  - said managing machine comprises:
    - second charge means for writing said battery value on said recording medium; and
    - second return means for reading said battery value from said recording medium.

16. An operation management method comprising:
- a count value management step for finding an operation amount for each execution of a function owned by said managed software product and changing a count value according to the operation amount of a managed software product;
- an operation limit step for limiting the operation of said managed software product when said count value has reached a specified limit value; and
- a charge step for charging the current count value or said limit value when a charge value is entered from external means.

17. A medium containing a management software product for managing the operation of a managed software product, wherein said managed software product and said management software product are executed on computers, said management software product comprising:
- a module for finding an operation amount for each execution of a function owned by said managed software product and changing a count value according to the operation amount of said managed software product;
- a module for limiting the operation of said managed software product when said count value has reached a specified limit value; and
- a module for charging the current count value or said limit value when a charge value is entered from external means.

18. A recording medium containing a charge value read by a management software product for use in managing the operation of a managed software product, wherein said managed software product and said management software product are executed on computers, said management software product comprising:
- a module for changing a count value according to the operation amount for each execution of a function owned by said managed software product;
- a module for limiting the operation of said managed software product when said count value has reached a specified limit value; and
- a module for charging the current count value or said limit value when said charge value is entered.

19. A computer system having an interface software product between an operation system and at least one application software product, wherein said interface software product comprises:
- a module for finding an operation amount for each execution of a function owned by said application software product and changing a count value according to the operation amount of said application software product;
- a module for limiting the operation of said application software product when said count value has reached a specified limit value; and
- a module for charging the current count value or said limit value when a charge value is entered from external means.

* * * * *